(12) United States Patent
Rajagopalan et al.

(10) Patent No.: US 11,917,000 B2
(45) Date of Patent: Feb. 27, 2024

(54) MESSAGE QUEUE ROUTING SYSTEM

(71) Applicant: Bank of America Corporation, Charlotte, NC (US)

(72) Inventors: Anurajam Rajagopalan, Medavakkam, IN (US); Sathyanarayana Rajendran, Chennai, IN (US); Sunil Kumar Sriperambudur, Peerancheru, IN (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/742,868

(22) Filed: May 12, 2022

(65) Prior Publication Data

US 2023/0370519 A1    Nov. 16, 2023

(51) Int. Cl.
   *G06F 15/16*   (2006.01)
   *G06F 9/50*    (2006.01)
   (Continued)

(52) U.S. Cl.
   CPC ........ *H04L 67/1008* (2013.01); *G06F 9/5027* (2013.01); *H04L 45/302* (2013.01); *H04L 67/63* (2022.05)

(58) Field of Classification Search
   CPC ... H04L 67/1008; H04L 45/302; H04L 67/63; G06F 9/5027
   See application file for complete search history.

(56) References Cited

U.S. PATENT DOCUMENTS 10,200,486 B2 *  2/2019  Herrick .................. H04L 67/60
10,356,222 B2    7/2019  Ghosh et al.
(Continued)

FOREIGN PATENT DOCUMENTS

| CN | 106919622 B | * | 10/2021 | ........... G06F 16/254 |
| EP | 3864807 B1 | * | 11/2022 | ............. H04L 45/30 |
| WO | WO-2006055406 A2 | * | 5/2006 | ............. H04L 67/28 |

OTHER PUBLICATIONS

Sanika Raje, Performance Comparison of Message Queue Methods, UNLV, Aug. 2019.

*Primary Examiner* — Ario Etienne
*Assistant Examiner* — Thorne E Waugh
(74) *Attorney, Agent, or Firm* — Banner & Witcoff, Ltd.

(57) ABSTRACT

A message queue routing system may be implemented into a message queue gateway to route data to Software component designed and deployed into MQ Gateway to route the data to the MQ cluster. A central processing unit (CPU) node analyzer reads real time health statistics of each of a plurality of MQ cluster processing nodes. Based the computation, the CPU node analyzer routes the message to a specified node of the cluster having a minimum of CPU load at that time. The CPU node analyzer analyzes information comprising at least CPU performance information and system idleness information. Each processing node enables dynamic message routing computations utilizing an artificial intelligence/machine learning framework and a plurality of trained predictive models. The predictive model is trained using a trained data set using text classification. Message information is extracted from the message via natural language processing and is processed via the trained model to identify characteristic information of the message. The characteristic information is used to select a subset of filters associated with message functionality. The message is routed to a target application based on filtering performed using the subset of filters.

20 Claims, 8 Drawing Sheets

(51) Int. Cl.
*H04L 45/302* (2022.01)
*H04L 67/1008* (2022.01)
*H04L 67/63* (2022.01)

(56) References Cited

U.S. PATENT DOCUMENTS

| | | | |
|---|---|---|---|
| 10,521,284 B2* | 12/2019 | McClory | H04L 41/5054 |
| 10,673,936 B2* | 6/2020 | Maddali | H04L 67/1025 |
| 10,778,660 B1* | 9/2020 | Rajaram | H04L 67/63 |
| 11,237,880 B1* | 2/2022 | Raumann | G06F 9/5077 |
| 11,269,678 B2* | 3/2022 | Gruber | G06F 9/4856 |
| 11,418,583 B2* | 8/2022 | Gokavarapu | H04L 67/1008 |
| 2007/0143455 A1* | 6/2007 | Gorman | G06F 11/3495 |
| | | | 714/E11.207 |
| 2012/0233668 A1* | 9/2012 | Leafe | G06F 9/44526 |
| | | | 726/4 |
| 2014/0006597 A1* | 1/2014 | Ganguli | H04L 41/12 |
| | | | 709/224 |
| 2014/0229480 A1 | 8/2014 | Buxbaum et al. | |
| 2015/0310401 A1 | 10/2015 | Siracusa | |
| 2015/0381709 A1 | 12/2015 | Word | |
| 2016/0182328 A1 | 6/2016 | Bhasin et al. | |
| 2018/0314407 A1 | 11/2018 | Dinh et al. | |
| 2018/0324118 A1 | 11/2018 | Dinh et al. | |
| 2018/0365308 A1 | 12/2018 | Kondo et al. | |
| 2019/0104035 A1* | 4/2019 | Cidon | H04M 15/51 |
| 2019/0222510 A1* | 7/2019 | Pitio | G06Q 20/2295 |
| 2020/0137151 A1* | 4/2020 | Chi | H04L 67/63 |
| 2020/0151006 A1* | 5/2020 | Kancharla | G06F 9/5027 |
| 2021/0120080 A1* | 4/2021 | Mishra | H04L 67/61 |
| 2021/0297499 A1* | 9/2021 | Slovetskiy | H04L 67/562 |
| 2022/0052905 A1* | 2/2022 | Vasseur | H04L 41/14 |
| 2022/0198117 A1* | 6/2022 | Raumann | G06F 13/28 |

\* cited by examiner

Pseudo code for CPU Node Analysis Engine

```
import paramiko as pk
from collections import OrderedDict
from operator import itemgetter
# Hostname of cluster are stored in list
Hostnames_List=["Hostname1","Hostname2","Hostname3","Hostname4"]
Hostname_CPUDetails={}
userName="ServiceID"
port=22

.....
def getCPUUtilization():
   ssh_connect=pk.SSHClient()
   ssh_connect.load_system_host_keys()
   #command to get the cpu utilization
   cmd="ps -eo pcpu,pid,user,args | sort -k 1 -r | grep mqsi | awk '{print $1}'"
   for hostname in Hostnames_List:
      (stdin,stdout,stderr)= ssh_connect.exec_command(cmd)
      # reading and saving the details of server in dictionary
      for data in stdout.readline():
         Hostname_CPUDetails.update({hostname,data})

def sortCPUResults():
   CPU_HostnamesSorted = OrderedDict(sorted(Hostname_CPUDetails.items(), key=itemgetter(1)))
   postData(list(CPU_HostnamesSorted.keys())[0])

.....

getCPUUtilization()
sortCPUResults()
```

FIG. 5A

Pseudo code for Predictive modeling

```
from sklearn.feature_extraction.text import TfidfVectorizer
from sklearn.cluster import KMeans
import numpy as np
import pandas as pd vectorizer = TfidfVectorizer(stop_words='english')
X = vectorizer.fit_transform(<train data folder>)

cluster_count = <no of labels>
model = KMeans(n_clusters=cluster_count, init='k-means++', max_iter=100, n_init=1)
.....

model.fit(X)

X = vectorizer.transform([<Input Data>])
.....

filter_lable = model.predict(X)
computeFilter(<inputData>,filter_label)

MESSAGE QUEUE ROUTING SYSTEM

BACKGROUND

Often, a real time integrated event routing service may be built to filter and/or transform messages from a source application provided by a first vendor to another target application provided by a different vendor. Such event routing services may utilize a dynamic cache file to store all necessary interface information required for this routing. As such, the size of the dynamic cache flow increased based on a number of filters added for each new vendor application onboarded into the enterprise network.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure provide solutions that address and overcome technical problems associated with intelligently routing messages. In particular, one or more aspects of the disclosure relate to analyzing messages and intelligently distributing analysis of messages for message routing among different processing nodes.

A message queue routing system may be implemented into a message queue gateway to route data to Software component designed and deployed into MQ Gateway to route the data to the MQ cluster. A central processing unit (CPU) node analyzer reads real time health statistics of each of a plurality of MQ cluster processing nodes. Based the computation, the CPU node analyzer routes the message to a specified node of the cluster having a minimum of CPU load at that time. The CPU node analyzer analyzes information comprising at least CPU performance information and system idleness information. Each processing node enables dynamic message routing computations utilizing an artificial intelligence/machine learning framework and a plurality of trained predictive models. The predictive model is trained using a trained data set using text classification. Message information is extracted from the message via natural language processing and is processed via the trained model to identify characteristic information of the message. The characteristic information is used to select a subset of filters associated with message functionality. The message is routed to a target application based on filtering performed using the subset of filters.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A and 5B show illustrative pseudo code for performing aspects of this disclosure.

DETAILED DESCRIPTION

Figure 1A:
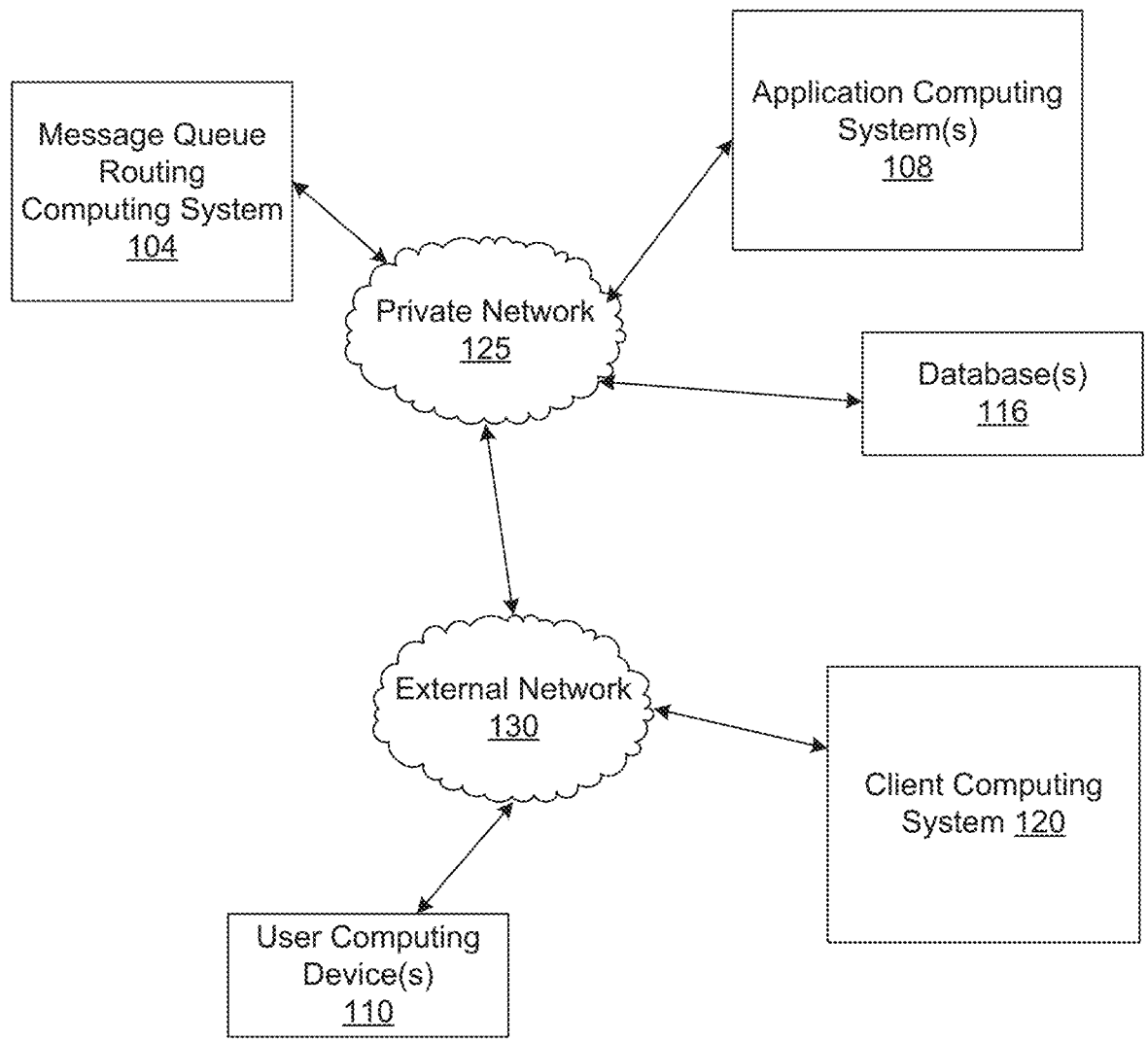
FIG. 1A shows an illustrative computing environment for routing messages, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

A traditional approach to routing incoming messages to the application may include routing inbound messages in round-robin fashion. Such routing may be equally distributed across all processing nodes, irrespective of the node availability. When equal weighting is given all processor nodes, certain nodes of the system may be more heavily loaded dependent upon message complexity. Additionally, for a content-based routing, criteria evaluations may be performed based on few parameters received from the input messages and such parameters may be compared against all data stored in the dynamic cache file. With the increase in number of filters, the filtering process gets complicated when performing the filter evaluation against each filter stored in cache to identify the target system. As such, the routing performance is limited due to the challenging nature for processor load and processor node heap size, so that a number of transactions able to be buffered or otherwise stored requires an increasing memory size. Further, CPU utilization may spike based on a volume of messages and the message complexity used as filtering criteria as executed for each of the transaction processed in the processing node. Here, the message routing performance capability is bound by both CPU utilization and processing time. As such, processing SLA is often not met for the target system. As such a need has been recognized to improve messaging routing capabilities.

A message queue routing system, such as a two-fold message queue routing system using a CPU Node Analyzer with intellectual apparatus may be a software component designed and deployed into a message queue (MQ) gateway to route the data to the MQ cluster. A CPU Node Analyzer may read, or otherwise acquire, the health statistics of one or more MQ cluster nodes and, based on the computation, route the message to the desired node of the cluster. This evaluation may be done based on the CPU performance and/or system idleness identified. To enable the message computation in dynamic and/or a/faster mode, a software-based solution may be implemented using artificial intelligence/machine learning (AI/ML) framework that is merged with other message queue processing application code. An AI/ML framework engine may create and/or train a predictive model from a trained data set using text classification and natural language processing (NLP) of message information. Input data may be fed into the predictive model to produce an appropriate label, which may be then fed to a filter repository to extract the appropriate filter to allow the message queue routing system to route the data to target application. In some cases, one or more aspects may be implemented in one or more computing languages, such as python, C, C++ and the like. Additionally, one or more AI/ML models may be used.

FIG. 1A shows an illustrative computing environment 100 for automated detection and mitigation of adversarial ML-based attacks, in accordance with one or more arrangements. The computing environment 100 may comprise one or more devices (e.g., computer systems, communication devices, and the like). The computing environment 100 may comprise, for example, an message queue routing system 104, one or more application system 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise an external computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the message queue routing system 104 and the application systems 108 as separate computing systems, the message queue routing system 104 may be integrated into one or more of the application systems 108.

The message queue routing system 104 may comprise one or more computing devices and/or other computer components (e.g., processors, memories, communication interfaces) configured to perform one or more functions as described herein. Further details associated with the architecture of the message queue routing system 104 are described with reference to FIG. 1B.

The application system(s) 108 may comprise one or more computing devices and/or other computer components (e.g., processors, memories, communication interfaces). In addition, the application system 108 may be configured to host, execute, and/or otherwise provide one or more enterprise applications. In some cases, the application systems 108 may host one or more services configured facilitate operations requested through one or more API calls, such as data retrieval and/or initiating processing of specified functionality. In some cases, an external computing system 120 may be configured to communicate via electronic messages with one or more of the application systems 108 via API function calls and the services. In an arrangement where the private network 125 is associated with a financial institution computing system (e.g., a banking computing system), the application systems 108 may be configured, for example, to host, execute, and/or otherwise provide one or more transaction processing programs, such as an online banking application, fund transfer applications, and/or other programs associated with the financial institution. The application systems 108 may comprise various servers and/or databases that store and/or otherwise maintain account information, such as financial account information including account balances, transaction history, account owner information, and/or other information. In addition, the application systems 108 may process and/or otherwise execute transactions on specific accounts based on commands and/or other information received from other computer systems comprising the computing environment 100. In some cases, one or more of the application systems 108 may be configured, for example, to host, execute, and/or otherwise provide one or more transaction processing programs, such as electronic fund transfer applications, online loan processing applications, and/or other programs associated with the financial institution.

The application systems 108 may be one or more host devices (e.g., a workstation, a server, and the like) or mobile computing devices (e.g., smartphone, tablet). In addition, an application systems 108 may be linked to and/or operated by a specific enterprise user (who may, for example, be an employee or other affiliate of the enterprise organization) who may have administrative privileges to perform various operations within the private network 125. In some cases, the application system 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

In some cases, one or more application systems may comprise one or more computing devices and/or other computer components (e.g., processors, memories, communication interfaces) configured to host, execute, and/or otherwise provide one or more processes integrating AI functionality processing one or more ML/AI models to facilitate one or more transaction processing programs, such as goods ordering applications, electronic fund transfer applications, online loan processing applications, and/or other programs associated with providing a product or service to a user, and/or the like. With reference to the example where an application system is for processing an electronic exchange of goods and/or services. The application system may be associated with a specific goods purchasing activity, such as purchasing a vehicle, transferring title of real estate may perform communicate with one or more other platforms within the computing system 100. In some cases, the client application system may integrate API calls to request data, initiate functionality, or otherwise communicate with the one or more application systems 108, such as via the services. For example, the services may be configured to facilitate data communications (e.g., data gathering functions, data writing functions, and the like) between the application system and the one or more other application systems 108. In some cases, the AI functionality processed by the application system may be configured to adapt the ML/AI models in real-time based on inputs received to the system, such as commands received via the external network 130 from one or more user computing devices 110 and/or at least one external computing system 120.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the message queue routing system 104. For example, the database(s) 116 may store simulation failure data, historical failure data, business rules information, and the like In an arrangement, the database(s) 116 may be used for other purposes as described herein.

In one or more arrangements, the message queue routing system 104, the application systems 108, the external computing system 120, the user devices 110, and/or the other devices/systems in the computing environment 100 may be any type of computing device capable of receiving input via a user interface, and communicating the received input to one or more other computing devices in the computing environment 100. For example, the message queue routing system 104, the application systems 108, the external computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the message queue routing system 104, the application systems 108, the external computing system 120, the user devices 110, and/or the other devices/systems in the computing environment 100 may, in some instances, be and/or comprise special-purpose computing devices configured to perform specific functions.

Figure 1B:
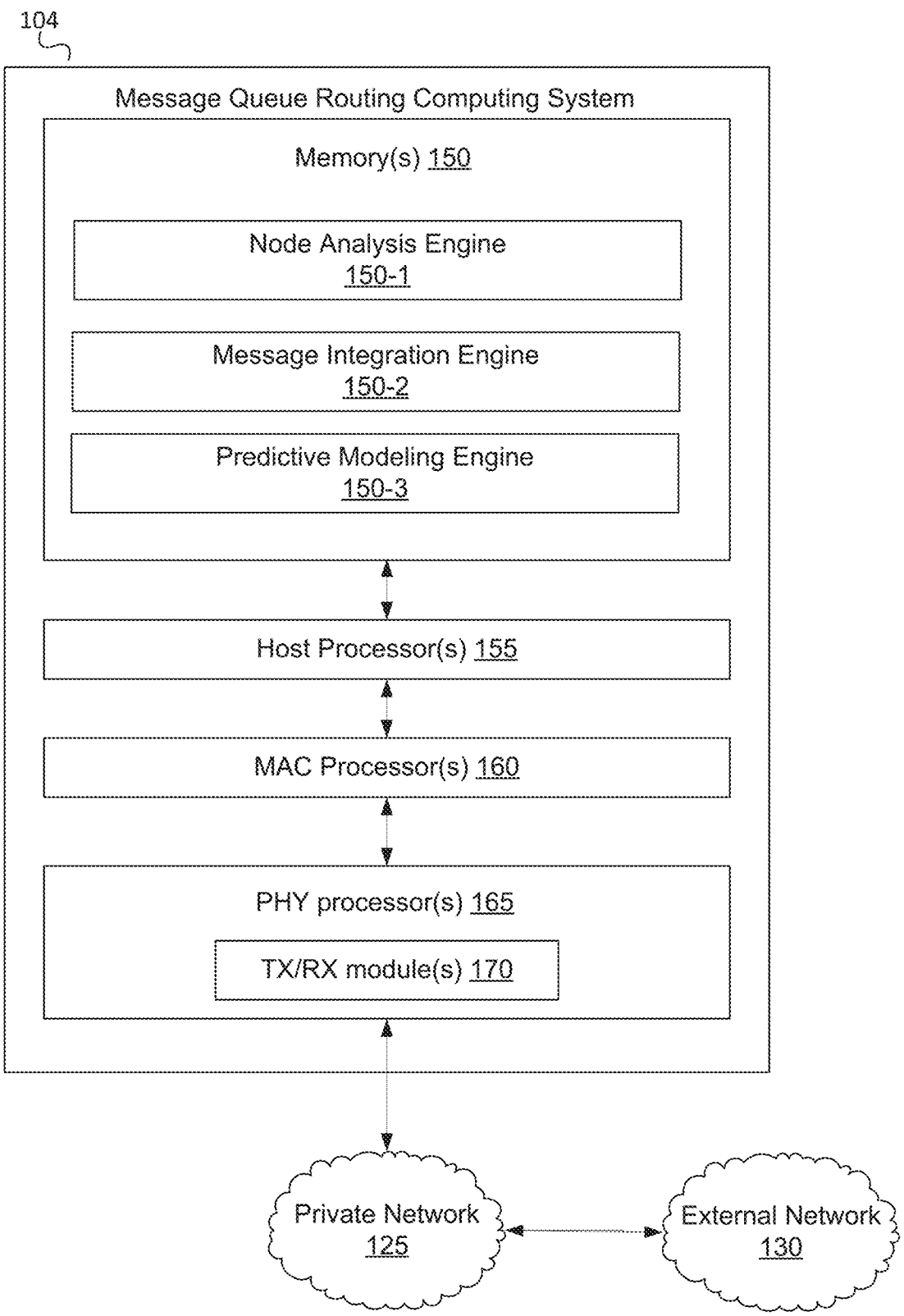
FIG. 1B shows an illustrative computing platform enabled for message queue routing, in accordance with one or more aspects described herein.

FIG. 1B shows an illustrative message queue routing system 104 in accordance with one or more examples described herein. The message queue routing system 104 may be a stand-alone device and/or may at least be partial integrated with the message queue routing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The API Route Testing System 105 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the message queue routing system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the message queue routing system 104 may be configured to execute machine readable instructions stored in memory 150. The memory 150 may comprise (i) one or more program modules/engines having instructions that when executed by the one or more processors cause the message queue routing system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the message queue routing system 104 and/or by different computing devices that may form and/or otherwise make up the message queue routing system 104. For example, the memory 150 may have, store, and/or comprise a node analysis engine 150-1, a message integration engine 150-2, a predictive modeling engine 150-3, and/or the like. The node analysis engine 150-1 may have instructions that direct and/or cause the message queue routing system 104 to perform one or more operations associated with optimizing CPU utilization and may act as a logical gateway to reroute messaging traffic. Performance related with a messaging processing cycle may be identified at a first pass, where the node analysis engine may enable tracking of CPU utilization for all the nodes of the cluster and, based on an identified node idle time, the traffic may be rerouted to the least utilized processing node. The message integration engine 150-2 may have instructions that may cause the message queue routing system 104 to perform operations associated with customized functions sort the computed messages into individual message queues and post messages to available cluster node for processing. The predictive modeling engine 150-3 may have instructions that direct and/or cause the message queue routing system 104 to perform operations associated with performing text classification of messages using custom analyzer, where the predictive modeling engine 150-3 may perform feature extraction with customized labels, train the collected labeled data to build a predictive model based on a NLP identified feature. Based on the predictive modeling, the incoming message will be evaluated with a content filter on to select the group of filters associated with the incoming message, thereby reducing the number of filters processed or stored in transmit memory.

While FIG. 1A illustrates the message queue routing system 104 and/or the application systems 108, as being separate elements connected in the private network 125, in one or more other arrangements, functions of one or more of the above may be integrated in a single device/network of devices. For example, elements in the API route testing system 105 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the message queue routing system 104, and/or the application systems 108.

Figure 2:
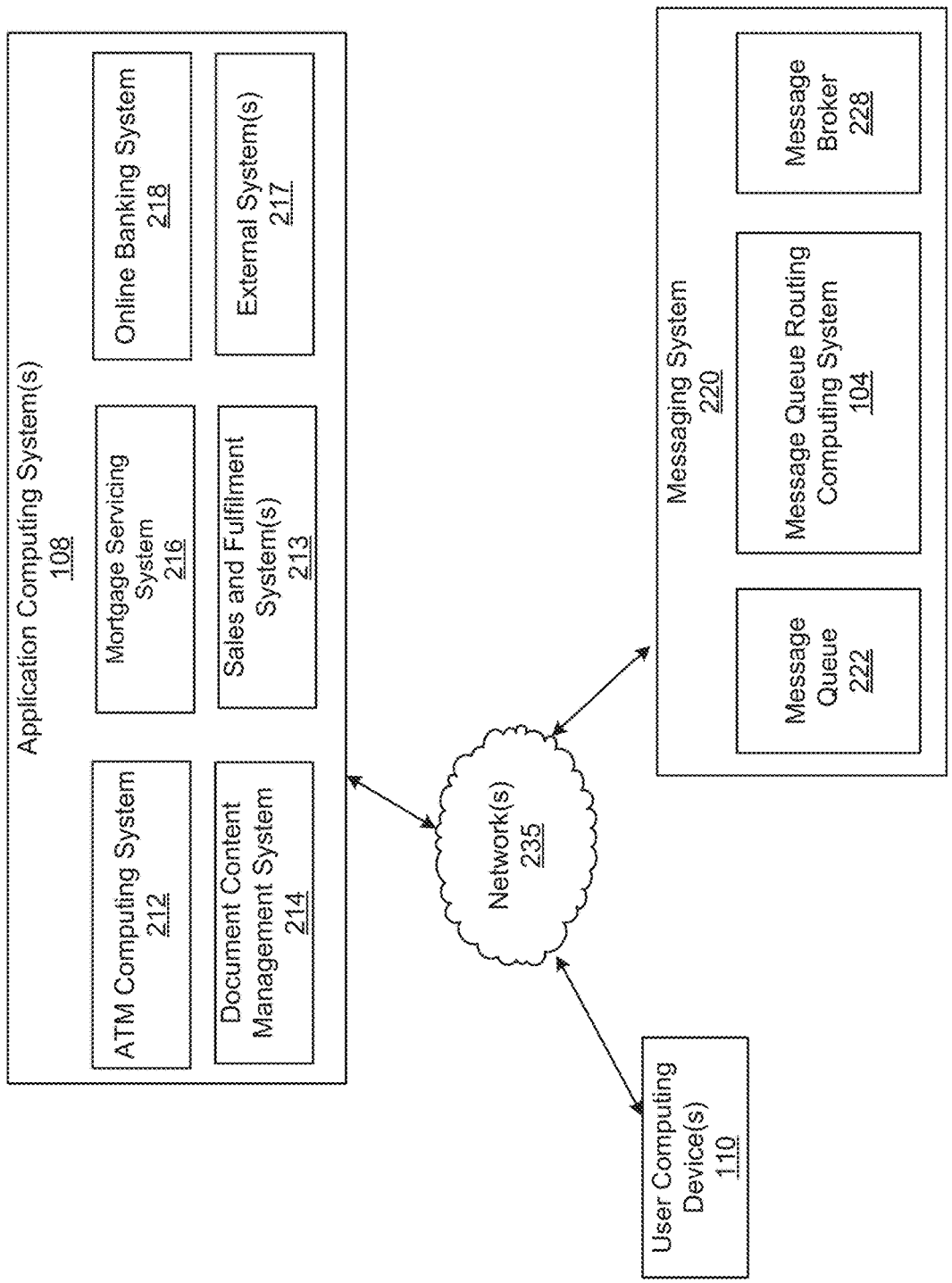
FIGS. 2 and 3 show illustrative high-level block diagrams of the process architecture, according to aspects of this disclosure.
Figure 3:
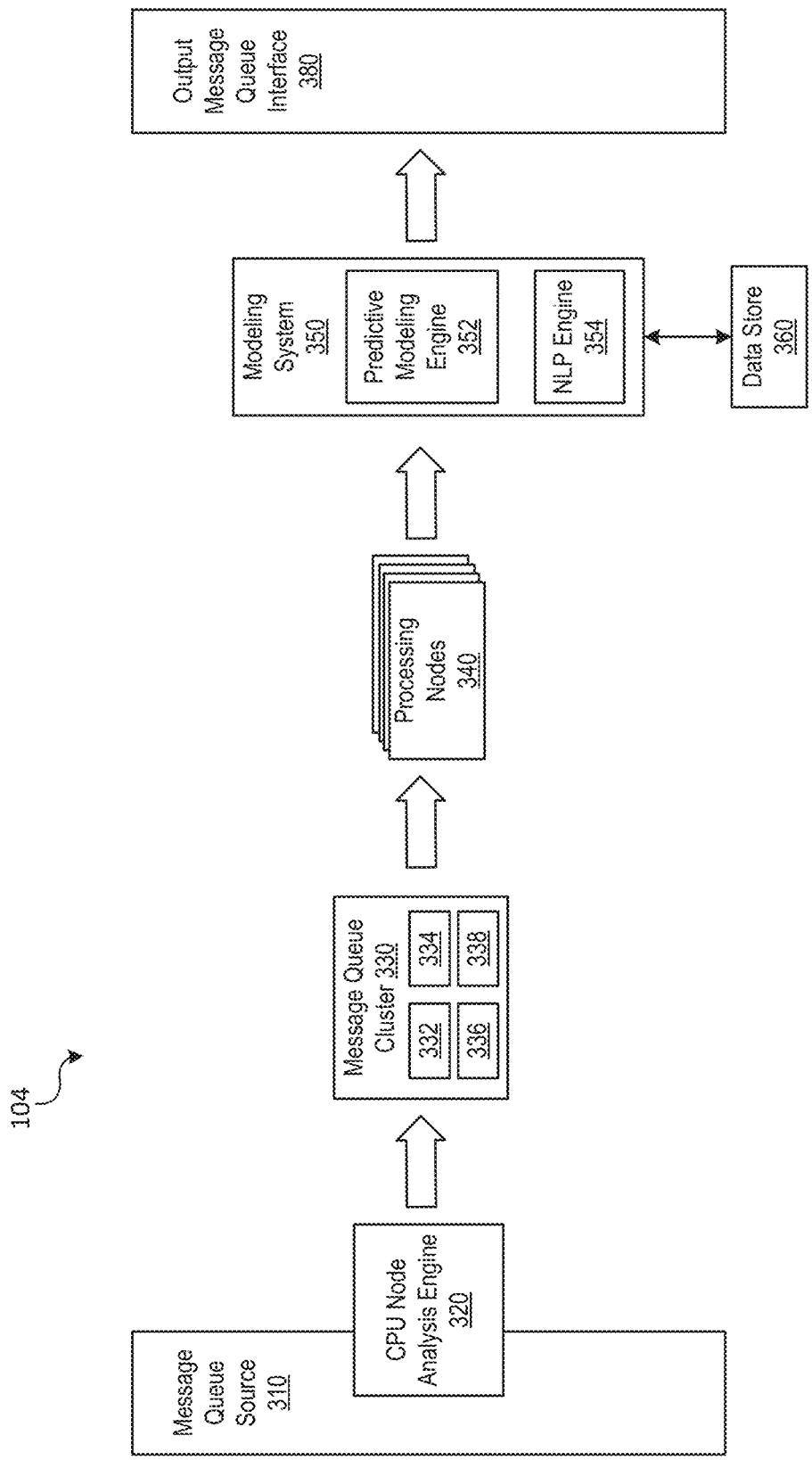

FIGS. 2 and 3 show an illustrative high-level block diagram of process architecture, according to aspects of this disclosure. This systems provides high accuracy for message routing with less computational time required. As such, I/O transient time is much reduced, as discussed further below with respect to FIGS. 5A and 5B. When implemented for highly available active nodes, the system allows for less complexity and easy maintenance because each cluster functions independently. Here, the CPU node analyze may overcome node downtime by rerouting messages from a failing node to active and available processors or nodes, thereby reducing maintenance costs and allows for utilizing a limited capacity of processor nodes within a distributed message queueing system.

An enterprise computing network may include one or more integrated application computing systems providing electronic products and/or services to a user, such as via one or more user computing devices 110, one or more networked workstations and/or between different ones of the application computing systems 108. In an illustrative example, an enterprise organization may be a financial institution, such as a bank, and the enterprise network may include one or more services to a user via application computing systems 108 connected via one or more networks 235, such as the private computing network 125 and/or the public computing network 130. The enterprise computing network of a financial institution may include systems such as an automated teller machine (ATM) computing system 212, a document content management system 214, a mortgage servicing system 216, one or more sales and fulfillment systems 213, an online banking system 218, and/or one or more external computing systems 217, such as vendor supplied computing systems. Because such application systems of the enterprise computing network provide multiple services to large numbers of customers and/or employees of the enterprise organization (e.g., hundreds, thousands, hundreds of thousands, and the like), routing of the electronic messages between the computing devices over the network involves continuously routing larger numbers (e.g., hundreds of thousands, millions, and the like) of messages from a source system to a target system of the plurality of application computing systems 108. As such, the message queue routing system 104 provides real-time, or near real-time-integrated message routing for messages routed from a source to a target system Messages routed from a source system The application systems 108 may comprise different applications developed over time by different development groups and/or vendors, such that different applications may utilize different communication protocols and/or formats. As such, routing incoming messages to the correct application may involve protocol bridging, message transformation, integrating the message content into different formats, building messaging in different format. Such functionality may be handled in a middle layer before delivering to the identified target system.

Figure 4A:
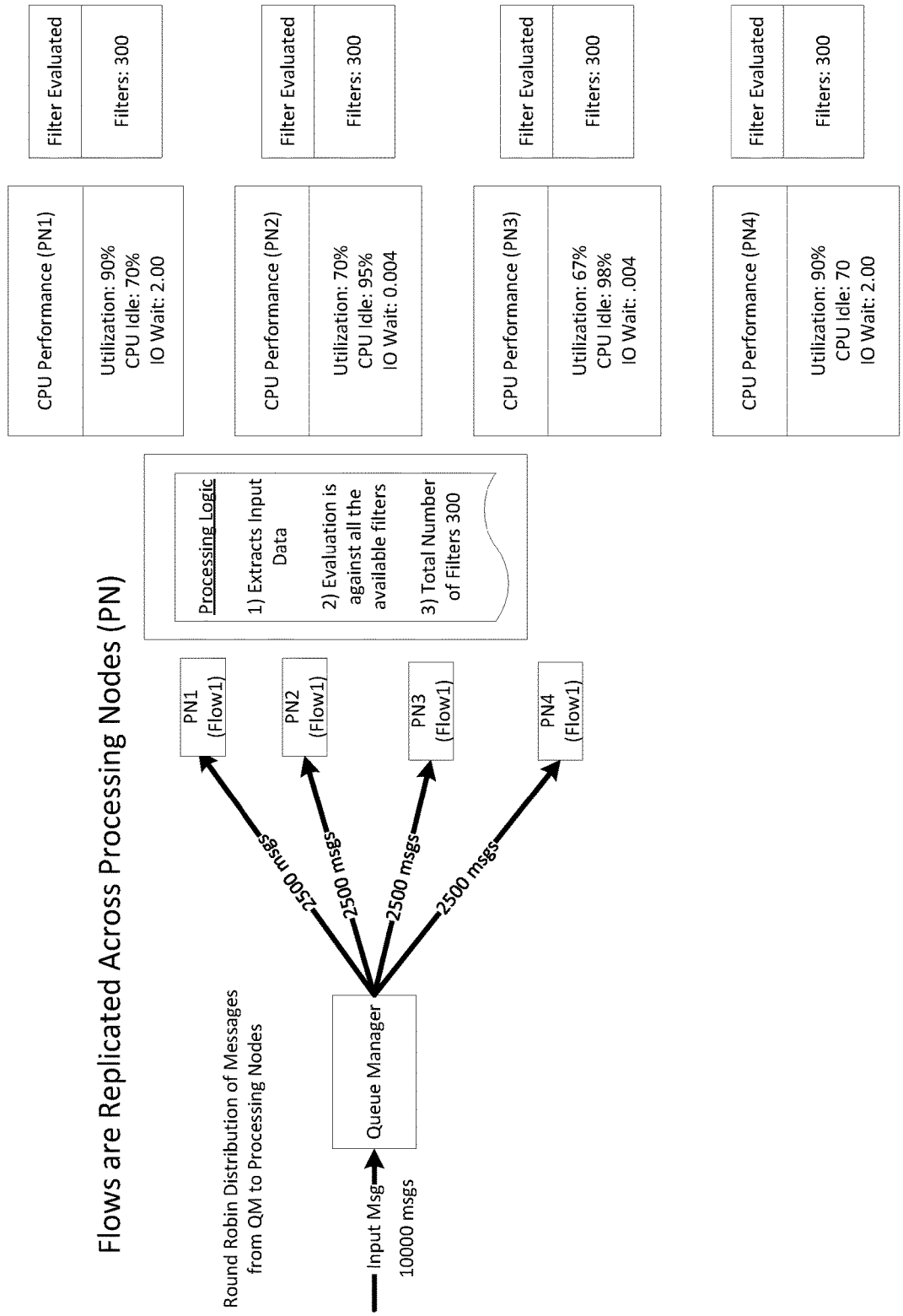
FIG. 4A shows an illustrative process for round robin distribution of messages and FIG. 4B shows an illustrative process using predictive modeling for distribution of messages according to aspects of this disclosure.

Previously, the middle layer may maintain a dynamically maintained cache at an application layer of a server, where the server will read the cache to identify processing needs required to communicate the message to the target system. Current systems may have much overhead when processing large numbers of messages in the queue, such as when the queued messages may be processed in a round-robin basis without regard to processing loads of different message queue (MQ) nodes. Instead, the messages may be equally distributed to the different clusters of MQ nodes. With a large volume of messages, one or more of the MQ nodes may experience a performance hit (e.g., high central processing unit (CPU) usage, low idle times, and the like), particularly in comparison with other MQ nodes. However, each MQ node may still have the same amount of messages to be processed and routed. Another function that the middle layer may perform on the cached messages may be content routing, where the content of each message may require analysis to further identify the correct target system. When a large volume of messages requires additional processing, the MQ node may experience a performance hit, but may still have the same amount of messages to be processed as the other MQ nodes. For example, current methods for content routing may process each message by using each of a plurality of filters (e.g., hundreds of filters, thousands of filters, and the like) to identify, from the message content, a desired target computing system. An illustration of a message routing system assigning messages in a round robin format and evaluating each filter of a plurality of filters (e.g., hundreds of filters, thousands of filters, and the like), along with CPU load information and other device loading information is shown in FIG. 4A. Because each message requires processing by all filters, the filtering adds additional loading to each MQ node. As such a need has been recognized for improved and intelligent systems and methods for routing of messages to target applications within an enterprise organization.

In FIG. 2, a user may access an application via one or more user computing devices 110 that may be communicatively coupled via one or more computing networks 235, such as the internal network 125 and/or the external network 130. The applications may be provided by one or more of the application computing systems 108, where messages may be communicated between applications, such as for data requests, user identification, user verification, security processing, and the like. Illustrative application computing systems may include, such as for a financial institution, the ATM computing system 212, a document content management system 214, a mortgage servicing system 216, one or more sales and fulfillment systems 213, an online banking system 218, and/or one or more external computing systems 217, such as vendor supplied computing systems (e.g., an electronic security computing system, and the like). Each message communicated via the networks 235 may be processed and routed by a messaging system 220. The messaging system 220 may include a message queue 222 to queue and/or buffer messages to be processed, the message queue routing computing system 104 to intelligently and efficiently route each message, and a message broker 228 to communicate the message to a target computing system identified by the message queue routing computing system 104.

Turning to FIG. 3, the message queue routing computing system may include a message queue source 310 and a CPU node analysis engine 320, a message queue cluster 330 comprising a plurality of MQ managers 332-338, a plurality of processing nodes 340, a modeling system 350 comprising a predictive modeling engine 352 and a natural language processing (NLP) engine 354, which may be communicatively coupled to a data store 360, and an output message queue interface 380.

The message queue source 310 may comprise a server-based interface to the message queue 222 to facilitate access to each of the queued messages. The CPU node analysis engine 320 may be incorporated in the same server as the message queue source 310 and/or a different server. The message queue source 310 may operate in near real time to monitor incoming communications to the enterprise communication system and to push messages into the message queue system. The message queue source 310 may operate in real time, or near real time, to initiate processing of incoming messages that may require quick message routing. For example, a service support system may receive messages concerning real-time status information of networked devices, where the information may need to be processed quickly to assist in providing near real-time support. Additionally, enterprise networks routinely receive millions and millions of data transactions that may be sourcing into different technologies, such as databases and the application computing systems 108, where the databases and applications may be sourced from multiple vendors and/or development groups, where each database and/or application may implement its own message queue technologies.

The CPU node analysis engine 320 may poll processing nodes 340 and/or the queue manager, node analyzer may analyze each processing node of the plurality of processing nodes 340 to determine an activity level, I/O processing times, idle times, CPU load information, and the like of each of the processing nodes 340. The CPU node analysis engine 320 may monitor the operational characteristics of each of the processing nodes 340 in real time, or near real time, and may process the operational status information for each of the processing nodes 340 to identify a server to which a message is to be processed. For example, the CPU node analysis engine 320 may process the operational status information for each of the processing nodes 340 to identify which processing node may be the least loaded, and may provide the processing node status information to the message queue cluster 330 for use in assigning a particular incoming message to an identified server for processing. In some cases, the CPU node analysis engine 320 may further process at least a portion of the message information (e.g., a data payload size) to identify an approximate or estimated processing time for use in making a processing node assignment determination. In some cases, incoming messages may be assigned to a particular processing node 340 with a most available CPU (e.g., most idle time, least processing usage, least populated I/O queue, and the like). In some cases, the CPU node analysis engine 320 may be incorporated into a same server as the message queue sources 310, such as a gateway queue manager device. In doing so, the CPU node analysis engine 320, in conjunction with the message queue cluster 330, may be an efficient distribution mechanism for incoming messages that facilitates assignment of each message to a most available processing node, based on CPU availability.

The MQ cluster 330 may facilitate application to application communications, such as by allowing for parallel processing of incoming messages via different message queues. The MQ cluster 330 may include message queue managers 332-338 to facilitate the multiple parallel message queue structure. Each message queue manager 332-338 is associated with a corresponding processing node of the processing nodes 340. Each processing node interfaces with the modeling system 360 to process and ultimately filter the message to identify the proper target computing system. Once the target computing system is identified, the message is moved by the processing nodes 340 to the output message queue interface 380 for delivery to the target application computing system 108 via the networks 235.

The processing nodes 340 are configured to process the message contents to identify a target message system based on the contents. For example, in a financial institution computing system, contents of an incoming message may identify deposit. Because many diverse application computing system 108 may relate to a deposit action, further filtering is required. For example, a customer may make a deposit to a checking account, a savings account, an investment account, a loan account and the like. Each of those different accounts may be associated with one or more different application computing systems 108. To further determine a correct target application computing system 108 for each message, the processing node identifies and applies one or more appropriate filters to the message to facilitate the destination identification. In the illustrative example, the processing node may apply one or more banking transaction filters, loan processing filters, investment transaction filters and/or the like. The modeling system 350 may include a predictive modeling engine 362 and a natural language processing (NLP) engine 354 and may be communicatively coupled to a data store 360. The modeling system 350 may be utilized by the one or more processing nodes 340 to identify one or more trained predictive models to predict a number of filters to apply to the message when determining a message destination.

The modeling system may store a plurality of trained models in the data store 260, where the models may be trained based on archived or other messages directed to particular applications systems. In some cases the NLP engine 354 may be triggered by the processing nodes 340 to analyze content of the message to identify keywords that may be associated with destination application computing systems. In some cases, property files may be associated with each application computing system and may include one or more phrases expected to be communicated in messages to that particular application computing system. In some cases, the processing node 340 may communicate at least a portion of the message content to the NLP engine 354 for processing. The NLP processing engine may extract one or more keywords, phrases, field names, embedded commands and the like from the message content, where the processing node 340 may pass at least a portion of the extracted information to the predictive modeling engine 352. The predictive modeling engine 352 may process the extracted information to identify whether at least one trained model may be applicable to process the data.

A trained model may be loaded from the data store 360 by the predictive modeling engine 352 to process the extracted data to predict a subset of the total filters to be applied to the data. In some cases, information corresponding to each filter may be stored in the data store 360, where the information comprises fields and text that identify a particular application as a target message destination. If a trained model cannot be found, a model may be trained using information corresponding to the new message. Additionally, a subset of the filters may be identified based on the model output.

In an illustrative example, a message may be received from a client computing device to trigger a deposit into an account. The message may be queued in the message queue source 310 while the CPU node analysis engine 320 analyzes in near real time, a current status of each processing node 340. The CPU node analysis engine 320 may identify a processing node with a minimum of CPU processing activity when compared to the other processing nodes 340. For example, the CPU analysis engine 320 may identify a particular processing node based on the processing node having a the most idle time and/or least CPU load at the time that the message is to be queued. The message may be forwarded to the message queue cluster 330 to be assigned to the corresponding message queue manager (e.g., message queue manager 334) associated with the identified processing node. The processing node may then utilize the NLP engine 354 to process the message contents and, based on the information extracted from the message by the NLP engine 354, initiate processing of the information by the predictive modeling engine 352 to identify a model to be processed and executing the identified trained and validated model to identify a subset of filters (e.g., 5 filters of 300 total filters) to be processed to identify the destination of the message.

Once the message is filtered (e.g., the message data is processed against the each of the identified subset of filters, the processing node identifies a message destination and sends the message to the output message queue interface 380 for delivery via the enterprise computing network to the identified target application system of the application computing systems 108. In some cases, a best-suited model may be chosen based on a message format and extracted data, where the model output may further identify filter criteria to execute and to identify filters associated with the identified filter criteria. In some cases, such as when a new model is being trained, additional filters may be identified for processing to ensure the appropriate message destination may be found. In some cases, if an error occurs and a message is rerouted, the predictive modeling engine 352 may be retrained based on the corrected information and a filter may also be updated or a new filter may be created. Additionally, each message received may be used to continually train the model in an automated continuous learning process. In doing so, new features and/or functionality, such as those associated with new functionality added to existing applications and/or new applications being added to the enterprise computing network, may be captured and included in the newly trained models to ensure efficient routing of messages.

FIG. 4A shows an illustrative process for round robin distribution of messages in an enterprise computing network. Here, messages may be received by a queue manager (e.g., 10,000 messages), where each processing node is assigned a same number of messages for processing (e.g., 2,500 messages) without consideration of the processing node loading, where CPU utilization and/or I/O utilization may delay processing of a particular message, thereby limiting the message throughput times, making networked communications inefficient. The processing logic executed by each processing node may extract input data from the message, evaluate the extracted content against every filter, or at least most available filters (e.g., 300 total filters) to ensure a correct message destination computing system is identified.

Figure 4B:
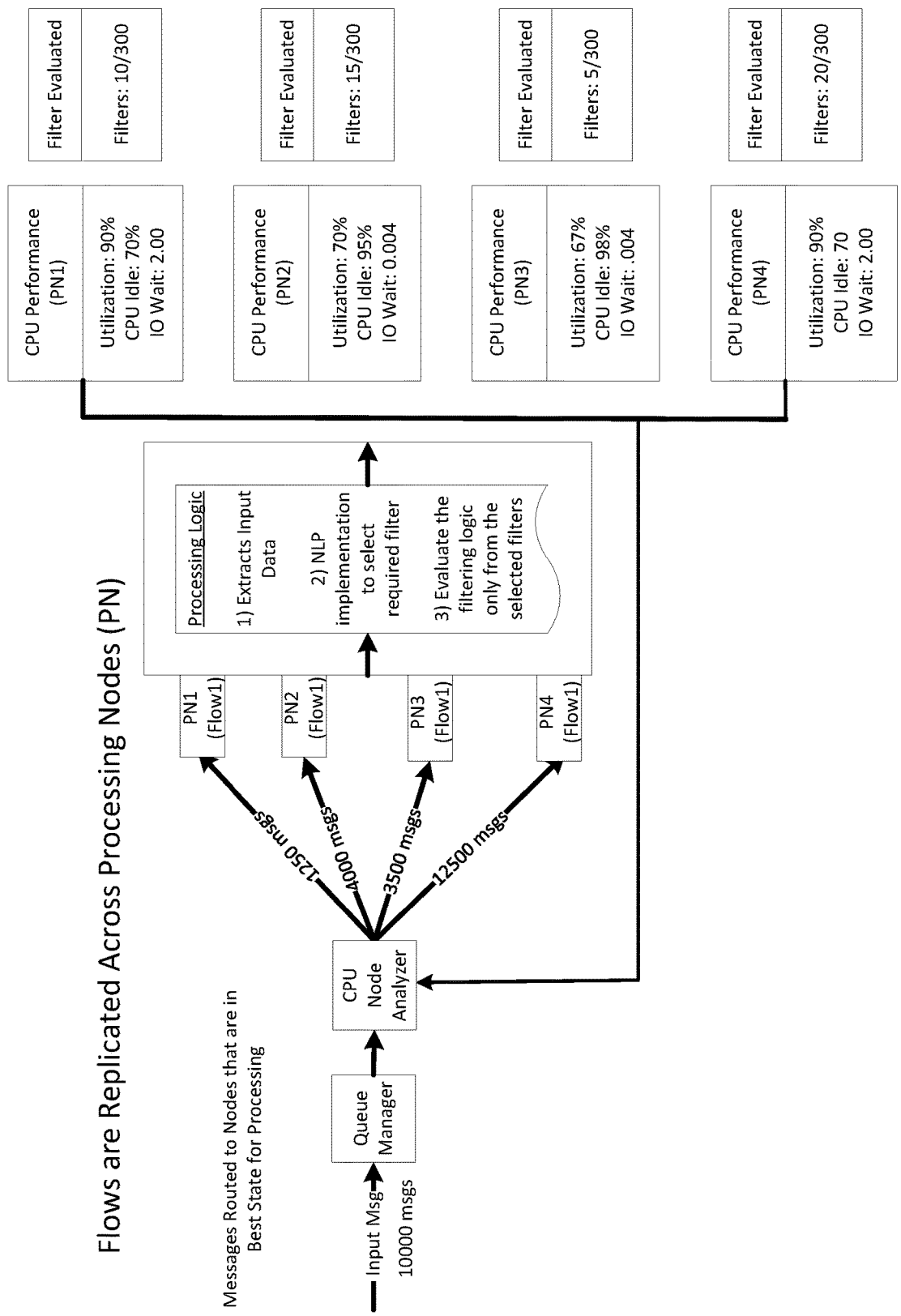

FIG. 4B shows an illustrative process using predictive modeling for distribution of messages according to aspects of this disclosure. Here, the queue manager may receive a number of messages (e.g., 10,000 messages), where a CPU node analyzer may analyze the processor node loading characteristics (e.g., CPU utilization, CPU idle time, I/O wait times, and the like) to identify a processing node best capable of processing the message at that particular instance of time. Because the CPU node analyzer operates in real time, or at least near real time, messages may be efficiently routed from the input message queue to one of a plurality of processing nodes for evaluation. In the illustrative example, a first processing node may be assigned 1250 messages, a second processing node may be assigned 4000 messages due to more favorable processing characteristics (e.g., more CPU idle time, less I/O wait times, less CPU utilization, and the like). A third processing node may be assigned 3500 messages and a fourth processing node may be assigned 1250 messages. Each processing node may extract input data and may utilize natural language processing (e.g., by a natural language processing engine) to select a filter based on a trained model processing the extracted information, where each message may be processed by a subset of filters (e.g., 10, 15, 5, 20, and the like) based on the processed model output. By improving the message routing by analyzing each processing node's capabilities in near real time and by predictively identifying appropriate filters for use in identifying a desired message destination, communication throughput is improved over previous round robin message processing schemes.

FIGS. 5A and 5B show illustrative pseudo code for performing aspects of this disclosure. For example FIG. 5A shows illustrative pseudo code processed by the CPU node analysis engine 320 to analyze, in near real time, the CPU loading characteristics of each of a plurality or processing nodes 340. For example, functions (e.g. get and Set methods) may be used to fetch the host details. For example, the function getCPUUtilization may be used to fetch the CPU utilization for each of the host listed in a MQ cluster configuration file, for example. A sortCPUResults function may be used to sort the CPU utilization results and provide an output identifying a least utilized CPU node to which message has to be posted for processing. A postData function may be used to post the message to the associated message queue for processing by the identified processing node.

FIG. 5B illustrates pseudo code for predictive modeling by the processing node including performing vectorization of the input data extracted from the message and one or more machine learning modeling information, such as for k-means modeling for example. As discussed above, get_ and set_ functions may be used to fetch the host details. A TfidfVectorizer function may be used to cleanse the input data before processing, such as by identifying stop words in a message and removing the identified words. The process may then identify the contributing features of the message, such as those extracted using natural language processing, to analyze the message data. One or more Kmeans functions may be used to identify a nearest closure value for the identified contributing features. The model may be pre-trained with training data and/or may be continuously trained with training data, where the trained model may be used to predict a possible destination of the incoming message, where that information may be used to identify a subset of filters to be processed based on the predicted possible message destination.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a plurality of application computing systems, each application computing system comprising a processor executing instructions to provide a computerized service based on a message received via a network;
a computing device comprising:
a first processor;
first non-transitory memory storing first instructions that, when executed by the first processor, cause the computing device to:
receive, at a message queue interface and via a network, a plurality of messages, wherein each of the plurality of messages is to be routed to an application computing system of the plurality of application computing systems;
capture, in near real-time, a plurality of health characteristics for each of a plurality of processing node computing devices; and
assign, based on an analysis of the plurality of health characteristics for each of the plurality of processing node computing devices, a message of the plurality of messages to a least utilized processing node computing device of the plurality of processing node computing devices; and the plurality of processing node computing devices, each processing node computing device comprising:
  a second processor;
  second non-transitory memory storing second instructions that, when executed by the second processor, causes the processing node computing device to:
    predict, based on natural language processing of contents of the message and by a trained model, a filter subset of a plurality of filters to apply to the message, wherein the filter subset identifies a message destination;
    apply the filter subset to the message to determine a target application computing system of the system; and
    route, via a network, the message to the target application computing system.

2. The system of claim 1, wherein the plurality of health characteristics comprises one or more of a central processing unit (CPU) load parameter, an idle time parameter, and an I/O wait time parameter.

3. The system of claim 1, wherein the filter subset comprises ten percent or less of the plurality of filters.

4. The system of claim 1 further comprising a message queue computing system, wherein each processing node of the plurality of processing nodes is associated with a different message queue of the message queue computing system.

5. The system of claim 1, wherein the second instructions further cause the processing node to:
  extract, via a natural language processing engine, a plurality of fields comprising message content corresponding to the target application computing system.

6. The system of claim 5, wherein the second instructions further cause the processing node to:
  determine, via a predictive modeling system processing the plurality of fields, a destination characteristic of the message; and
  generate, based on the destination characteristic, a destination label for the message, wherein the destination label is associated with a subset of the application computing systems.

7. The system of claim 6, wherein the instructions to apply the filter subset to the message further cause the processing node to determine the subset of filters based on the destination label.

8. A method comprising,
  queueing, in an input queue of a network, a plurality of messages;
  determining, in near real time based on central processing unit (CPU) load information of a plurality of message processing nodes, a current CPU utilization for each of the plurality of message processing nodes;
  assigning, each message of the plurality of messages in the input queue, to a processing node based on a comparison of current CPU utilization information for each of the plurality of message processing nodes;
  identifying, by the processing node, characteristic message information corresponding to application functionality at a destination computing system;
  predicting, based on natural language processing of the characteristic message information, a destination label associated with the message;
  filtering, the message information based on the destination label, based on a filter subset of a plurality of filters, wherein the filter subset identifies a message destination; and
  routing message based on a destination identified by output of the filter subset.

9. The method of claim 8, wherein the CPU load information comprises one or more of a CPU load parameter, an idle time parameter, and an I/O wait time parameter.

10. The method of claim 9, wherein the filter subset comprises ten percent or less of the plurality of filters.

11. The method of claim 9 wherein each processing node of the plurality of message processing nodes is associated with a different message queue of a message queue computing system.

12. The method of claim 9, further comprising
  extracting, via a natural language processing engine, a plurality of fields comprising message content corresponding to a target application computing system.

13. The method of claim 12, further comprising:
  determining, via a predictive modeling system processing the plurality of fields, a destination characteristic of the message; and
  generating, based on the destination characteristic, a destination label for the message, wherein the destination label is associated with a subset of application computing systems.

14. The method of claim 13, wherein the filtering causes the processing node to determine the subset of filters based on the destination label.

15. A message routing computing system, comprising:
  a message queue configured to queue a plurality of messages incoming to an enterprise computing system;
  a message queue processor processing instructions that cause the message queue processor to:
    determine, in near real time based on central processing unit (CPU) load information of a plurality of message processing nodes, a current CPU utilization for each of the plurality of message processing nodes; and
    assign, each message of the plurality of messages in the message queue, to a processing node based on a comparison of current CPU utilization information for each of the plurality of message processing nodes;
  the plurality of message processing nodes, wherein each of the plurality of message processing nodes processes instructions that cause the processing node to:
    identify characteristic message information corresponding to application functionality at a destination computing system;
    predict based on the characteristic message information, a destination label associated with the message;
    filter the message information based on the destination label and based on a filter subset of a plurality of filters, wherein the filter subset identifies a message destination; and
    route each message based on a destination identified by output of the filter subset.

16. The message routing computing system of claim 15, wherein the CPU load information comprises one or more of a CPU load parameter, an idle time parameter, and an I/O wait time parameter.

17. The message routing computing system of claim 15, wherein the filter subset comprises ten percent or less of the plurality of filters.

18. The message routing computing system of claim 15, wherein each processing node of the plurality of message processing nodes is associated with a different message queue of a message queue computing system.

19. The message routing computing system of claim 15, wherein the processing node processes further instructions to extract, via a natural language processing engine, a plurality of fields comprising message content corresponding to a target application computing system.

20. The message routing computing system of claim 15, wherein the processing node further executes instructions to:
   determine, via a predictive modeling system processing a plurality of fields, a destination characteristic of the message; and
   generate, based on the destination characteristic, a destination label for the message, wherein the destination label is associated with a subset of application computing systems.

* * * * *